United States Patent [19]

Harrison

[11] Patent Number: 4,690,388
[45] Date of Patent: Sep. 1, 1987

[54] PNEUMATIC VEHICLE SUSPENSION WITH FAILSAFE INTERNAL STOP

[75] Inventor: Reginald Harrison, Oadby, England

[73] Assignee: Dunlop Limited, United Kingdom

[21] Appl. No.: 931,882

[22] Filed: Nov. 17, 1986

Related U.S. Application Data

[63] Continuation of Ser. No. 713,639, Mar. 19, 1985, abandoned.

[30] Foreign Application Priority Data

Mar. 29, 1984 [GB] United Kingdom ............... 8408167

[51] Int. Cl.$^4$ .................. B60G 11/62; F16F 3/08
[52] U.S. Cl. .................... 267/35; 105/198.1; 248/631; 267/121; 267/140; 267/152; 267/141.1; 267/292; 280/712
[58] Field of Search ............. 267/8 R, 22 A, 22 R, 267/35, 63 R, 63 A, 3, 152, 153, 121, 116, 122, 139–140, 113, 123, 141.7, 64.11, 140.3, 136, 141, 141.1, 151, 6; 188/298; 280/712, 716, 710; 105/198.1, 453; 213/221, 43–44; 248/631, 632, 562, 565, 563, 573, 635, 634

[56] References Cited

U.S. PATENT DOCUMENTS

| | | | |
|---|---|---|---|
| 2,154,586 | 4/1939 | Stern | 267/63 R X |
| 2,241,409 | 5/1941 | Mason | 267/63 R X |
| 2,729,441 | 1/1956 | Henss | 267/63 R X |
| 2,893,665 | 7/1959 | Paulsen | 267/63 R X |
| 2,930,607 | 3/1960 | Hutzenlaub | 267/35 |
| 3,134,585 | 5/1964 | Trask | 267/141.1 X |
| 3,162,465 | 12/1964 | Vaugoyeau | 280/712 |
| 3,606,295 | 9/1971 | Appleton | 267/3 X |
| 3,806,106 | 4/1974 | Hamel et al. | 267/152 |
| 3,826,507 | 7/1974 | Brand et al. | 105/197 B X |
| 3,904,181 | 9/1974 | Harsy-Vadas | 267/35 |
| 3,941,061 | 3/1976 | Schindehutte et al. | 105/197 B X |
| 4,428,302 | 1/1984 | Herring, Jr. | 105/198.1 |

FOREIGN PATENT DOCUMENTS

| | | |
|---|---|---|
| 2747290 | 4/1979 | Fed. Rep. of Germany ........ 267/35 |
| 1285114 | 3/1961 | France ................. 267/35 |
| 191802 | 9/1964 | Sweden ................. 267/35 |
| 307154 | 3/1929 | United Kingdom . |
| 825591 | 12/1959 | United Kingdom . |
| 875512 | 8/1961 | United Kingdom . |
| 1248025 | 9/1971 | United Kingdom . |
| 1425229 | 2/1976 | United Kingdom . |

Primary Examiner—Douglas C. Butler
Attorney, Agent, or Firm—Stevens, Davis, Miller & Mosher

[57] ABSTRACT

A pneumatic spring for use in a vehicle suspension has provided within the pneumatic spring an elastomeric spring which is subject to load only in the event of a pressurization failure of the pneumatic spring. The elastomeric spring is secured at one end to the pneumatic spring and is of generally circular cross-sectional shape in a plane perpendicular to the normal direction in which it would be loaded. The spring additionally is of progressively increasing external diameter over a part of its length as considered in a direction from its secured end to the other, free, end whereby both the vertical compression stiffness and horizontal shear stiffness of the spring progressively increase when the spring is subject to an increasing compression loading in the event of a pressurization failure.

15 Claims, 3 Drawing Figures

PNEUMATIC VEHICLE SUSPENSION WITH FAILSAFE INTERNAL STOP

This application is a continuation of application Ser. No. 713,639, filed Mar. 19, 1985, now abandoned.

This invention relates to a vehicle suspension and in particular, though not exclusively, to a suspension for use in a rail vehicle resiliently to support a vehicle body relative to the vehicle wheels.

In accordance with one aspect of the present invention a vehicle suspension comprises a pneumatic spring comprising a pair of rigid members interconnected by a toroidal shape flexible member of substantially gas-impermeable material and provided within the pneumatic spring an elastomeric spring one end of which is connected to said first one of the rigid members and the other end of which is spaced from the other of said rigid members when the pneumatic spring is pressurized to a normal working pressure, said elastomeric spring being of generally circular cross-sectional shape in a plane perpendicular to the normal direction of movement of the rigid members one towards the other and said spring of elastomeric material being of progressively increasing external diameter over at least a part of the length thereof from one end of the spring to the other whereby both the vertical compression stiffness and horizontal shear stiffness of the elastomeric spring progressively increase when, in use, the elastomeric spring is subject to an increasing compression loading in the event of pressurization failure of the pneumatic spring.

Preferably said pneumatic spring is arranged in series with a second, external elastomeric spring one end of which is connected to either one of said rigid members and the other end of which is for connection to a vehicle body or wheel assembly.

It is preferred that the progressively increasing external diameter of the elastomeric spring within the pneumatic spring follows a convex path as considered in a plane containing said normal direction of movement of the rigid members one towards the other. The external diameter may increase progressively over the whole of the length of the elastomeric spring, but in the alternative the external surface of that part which is not of increasing diameter preferably is of a progressively decreasing diameter and more preferably is of a convex shape as considered in a plane containing said normal direction of movement of the rigid members one towards the other.

The elastomeric spring within the pneumatic spring preferably is of a hollow construction over part of the length thereof, and preferably said spring is positioned with said hollow part remote from that end of the spring which is connected to said first one of the rigid members.

Said elastomeric spring internal of the pneumatic spring and said other of the rigid members preferably are formed with interengageable location means such that in normal use of the vehicle suspension with the pneumatic spring inflated to a normal working pressure the respective location means are free from contact but interengage in the event of at least partial deflation of the pneumatic spring so as to restrain relative movement between said elastomeric spring and rigid member in a direction transverse to the normal direction of movement of the rigid members one towards the other.

Preferably the elastomeric spring internal of the pneumatic spring is provided with a location means which extends beyond that end of the spring nearest said other of the rigid members and which in the event of at least partial deflation of the pneumatic spring engages a location means formation of the rigid member.

Preferably the location means is in the form of a metal rod bonded to the elastomeric material of the spring and of a size which permits it to be received in a circular section recess in the rigid member. More preferably the location means is of a generally tapered form of a diameter which decreases towards the end of the location means furthest from the elastomeric spring. It is preferred that the location means be positioned centrally at the end face of the spring.

The elastomeric spring provided within the pneumatic spring preferably has a rigid, e.g. metal facing member for contact with said other rigid member in the event of at least partial depressurisation of the pneumatic spring. The facing member may be in the form of an annular disc bonded to the elastomeric material.

That elastomeric spring provided external of the pneumatic spring, normally to act in series therewith, may be of a construction generally similar to one of the constructions described herein in respect of the elastomeric spring which is located within the pneumatic spring but without the provision of central location means. Preferably, however, the external elastomeric spring is of a substantially hollow construction over at least a half of the length thereof. A facing plate may be bonded to that end of the spring furthest from said one of the rigid members, and that plate may be provided with attachment means to facilitate connection of the vehicle suspension to a vehicle body or wheel assembly.

The vehicle suspension described herein may be used as a secondary suspension unit of a bogied rail vehicle of a kind in which wheel axles are resiliently mounted relative to the bogie by primary suspension units. It is believed, however, that the vehicle suspension described herein is of particular suitability for use in the suspension of vehicles of a kind wherein the wheel axles are mounted substantially directly to the vehicle body, the vehicle suspension between the axle box and vehicle body then serving to perform the combined functions of conventional primary and secondary suspension units.

One embodiment of the invention will now be described, by way of example, with reference to the accompanying diagrammatic drawings wherein.

Figure 1:
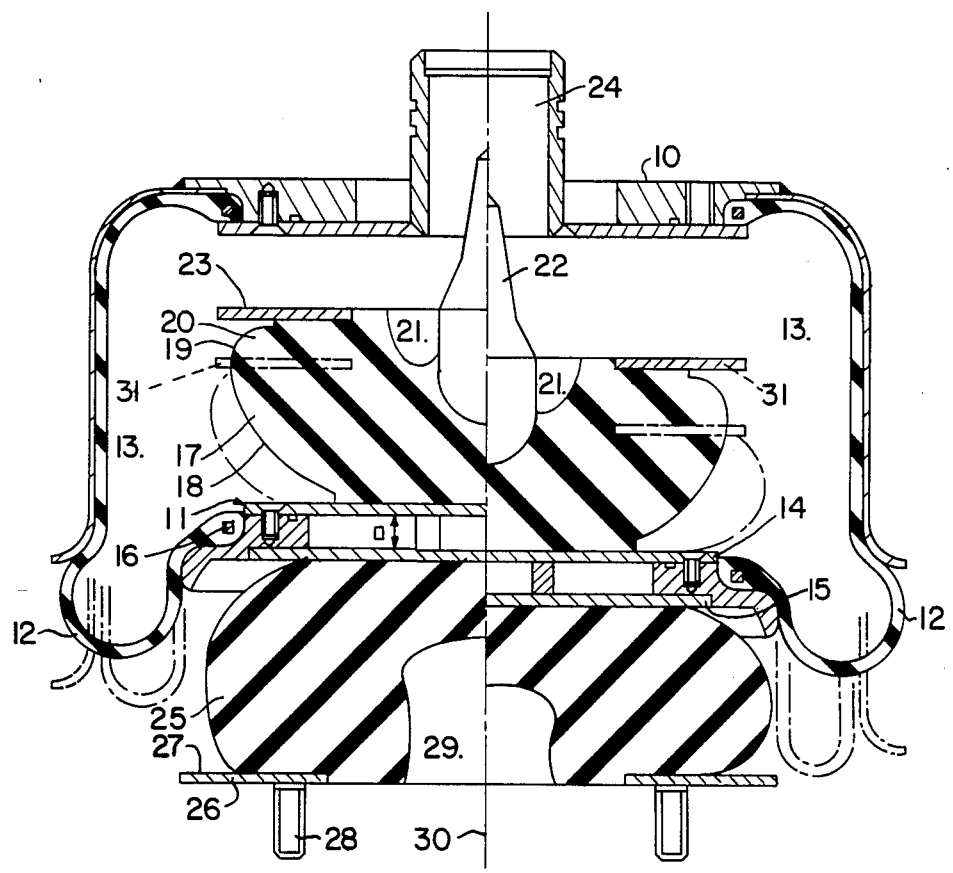
FIG. 1 is a sectional view of a vehicle suspension unit in accordance with the present invention.
Figure 2:
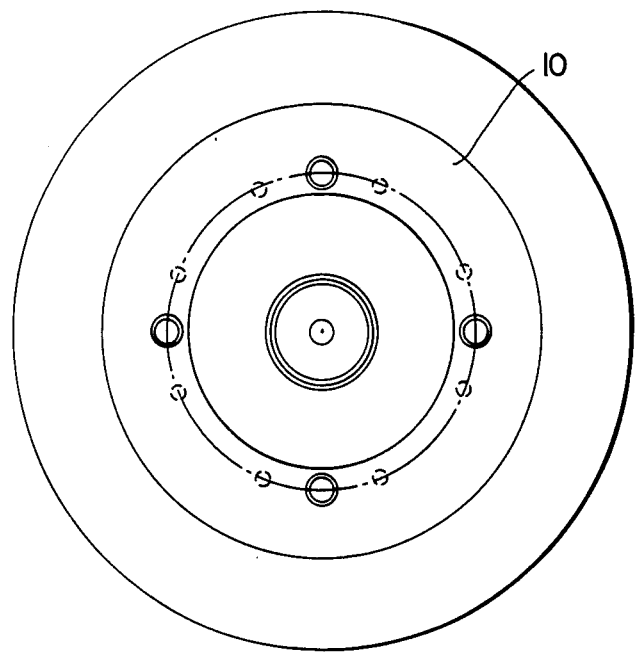
FIG. 2 is a plan view of the vehicle suspension unit shown in FIG. 1; and, FIG. 3 is a section view similar to FIG. 1 of an alternative elastomeric spring thereof.

A vehicle suspension unit comprises an upper rigid member 10, a lower rigid member 11 and extending there-between, and in air-tight contact therewith, a toroidal shape reinforced rubber diaphragm 12 which defines in conjunction with said rigid members a chamber 13 into which pressurized air may be admitted by valve means (not shown).

The lower rigid member 11 is of a composite construction comprising a pair of metal plates 14, 15 spaced apart by a distance "d" which is slightly greater than the thickness of that beaded edge 16 of the diaphragm which is secured to the member 11.

An upper 14 of said plates has bonded thereto an elastomeric spring 17 which is circular in cross-section as considered in planes parallel with the bonded surface of the upper plate 14. For approximately two-thirds of its length, as considered in a direction perpendicular to the plane of the plate 14, the spring 17 is solid in cross-section and the external surface 18 thereof is of progressively increasing diameter, following a convex path, considered in a direction away from said plate 14. For the remaining part of the length of the spring 17 the elastomeric material thereof is of an annular shape in cross-section and the associated external surface 19 is of progressively decreasing diameter, following a convex path, as considered in a direction away from said plate 14.

The end 20 of spring 17 furthest from the plate 14 has bonded thereto an annular metal plate 23 and outer diameter of which corresponds with the diameter of the upper rigid member 10.

The cavity 21 defined by the annular shaped portion of elastomeric material has bonded thereto a metal location pin 22 which projects beyond the end of the spring and which extends partway into a cavity 24 in the upper rigid member 10 in use of the vehicle suspension with the chamber 13 at a normal working pressure.

The lower, 15, of said plates of the lower rigid member has bonded thereto one end of an elastomeric spring 25. The other end of the spring has bonded thereto an annular metal plate 26 the outer diameter of which is greater than the external diameter of the bonded area so as to provide a smooth annular buffer surface 27 against which the elastomeric material bears when subject to compression and/or shear load. Four studs 28 extend from the plate 26 to facilitate attachment of the vehicle suspension unit to a vehicle bogie or axle box.

The spring 25, external of the air spring, is of progressively increasing external diameter, following a convex path, over half of the length thereof as considered in the direction away from the plate 15, then of progressively decreasing external diameter, also following a convex path, as considered in the same direction when in a loaded condition as illustrated. When in an unloaded condition the spring is of progressively increasing external diameter over the whole of its length. That half of the spring 25 furthest from the plate 15 is of a generally hollow form, the elastomeric material defining a cavity 29 which is freely vented to atmosphere.

In normal use of the afore-described vehicle suspension unit in a rail vehicle the upper plate 10 is secured to a vehicle body or chassis and the lower annular plate 26 is secured to a bogie or axle bearing in such manner that the axis 30 of compression of the spring is vertical when the vehicle is on level ground.

During normal use the air spring and elastomeric spring 25 act in series to withstand compression and shear loads.

The elastomeric spring 17 is in an unloaded condition during said normal use and its annular upper plate 23 lies in either of the positions shown in full line on the left and right hand halves of FIG. 1 depending on whether the vehicle is in an unladen or a fully laden condition respectively.

In the event of partial or complete depressurization of the air chamber 13 the annular plate 23 of elastomeric spring 17 contacts the upper rigid member, in a controlled centralized manner by virtue of location of the pin 22 in cavity 24, and the loads to which the vehicle suspension unit is subject are withstood by the two elastomeric spring 17, 25 acting in series one with the other. The annular upper plate 23 will then adopt either of the positions 31 as shown in dashed outline on the left and right hand halves of FIG. 1 depending respectively on whether the vehicle is in an unladen or a fully laden condition.

Figure 3:
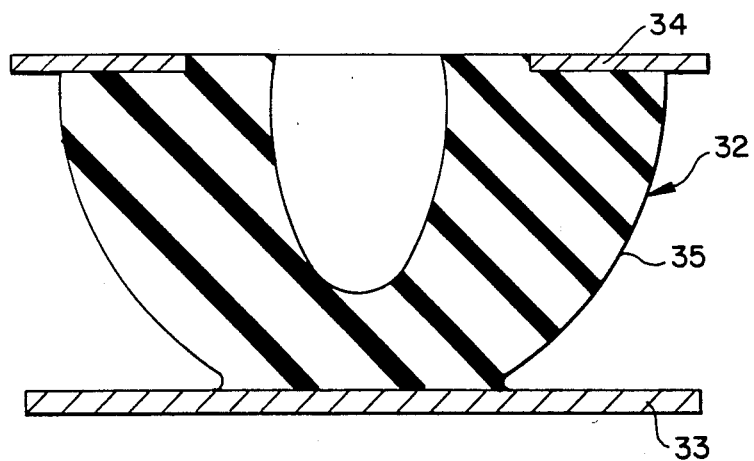

FIG. 3 is a cross-sectional view in the same plane as that of FIG. 1 of an alternative shape for the spring 17 of FIG. 1. The spring 32 of FIG. 3 in common with spring 17 of FIG. 1 is of a hollow form over part of its length and is bonded at its respective ends to a pair of plates 33, 34 which are generally similar to the plates 14, 23 of FIG. 1. However, the outer surface 35 of the spring 32 differs from surface 18 of spring 17 in that it is of a progressively increasing external diameter over the whole of the length of the spring.

I claim:

1. A vehicle suspension comprising a pneumatic spring having a closed body with first and second rigid members interconnected by a toroidal shape flexible member of substantially gas-impermeable material and provided within the pneumatic spring an elastomeric spring having a first end connected to said first rigid member and a second end which is spaced from said second rigid member when the closed body of the pneumatic spring is pressurized to a normal working pressure, said second end being free to move transversely relative to said first end, the elastomeric spring being positioned within the closed body of the pneumatic spring such that in normal use of the vehicle suspension applied compression loading is withstood solely by the pneumatic spring and such that the applied compression loading acts on the elastomeric spring only in the event of a pressurization failure of the pneumatic spring, said elastomeric spring being of generally circular cross-sectional shape in a plane perpendicular to the normal direction of movement of the rigid members one towards the other and of pregressively increasing external diameter over at least a part of the length thereof from one end of the elastomeric spring to the other whereby in the event of pressurization failure of the pneumatic spring the elastomeric spring allows relative movement of the first and second rigid members both in said normal direction of movement of the rigid members one towards the other and in directions perpendicular thereto and whereby both the vertical compression stiffness and horizontal shear stiffness of the elastomeric spring progressively increase when, in use, the elastomeric spring is subject to an increasing compression loading.

2. A vehicle suspension according to claim 1 wherein the external diameter of the elastomeric spring within the pneumatic spring follows a convex path as considered in a plane containing said normal direction of movement of the rigid members one towards the other.

3. A vehicle suspension according to claim 1 wherein the external diameter of the elastomeric spring within the pneumatic spring increases progressively over the whole of the length of the elastomeric spring.

4. A vehicle suspension according to claim 1 wherein the external diameter of the elastomeric spring within the pneumatic spring increased progressively over part of the length of the elastomeric spring and decreased progressively over a remaining part of the length of the elastomeric spring.

5. A vehicle suspension according to claim 4 wherein the external surface of the part of progressively decreasing diameter is of a convex shape as considered in a plane containing said normal direction of movement of the rigid members one towards the other.

6. A vehicle suspension according to claim 1 wherein the elastomeric spring within the pneumatic spring is of a hollow construction over part of the length thereof.

7. A vehicle suspension according to claim 6 wherein the elastomeric spring is positioned with said hollow part remote from said first end of the elastomeric spring.

8. A vehicle suspension according to claim 1 wherein the elastomeric spring provided within the pneumatic spring has a rigid facing member for contact with the second rigid member in the event of at least partial de-pressurization of the pneumatic spring.

9. A vehicle suspension according to claim 1 wherein said elastomeric spring within the pneumatic spring and said second rigid member of the pneumatic spring are formed with interengageable location means arranged to interengage in the event of at least partial deflation of the pneumatic spring thereby to restrain relative movement between said elastomeric spring and rigid member in a direction transverse to said normal direction of movement of the rigid members one towards the other.

10. A vehicle suspension according to claim 9 wherein one of said location means is a rod of tapered shape.

11. A vehicle suspension according to claim 1 wherein said pneumatic spring is arranged in series with a second elastomeric spring external of the pneumatic spring and one end of which is connected to one of said rigid members and the other end of which is for connection to one of a vehicle body and a vehicle wheel assembly.

12. A vehicle suspension according to claim 11 wherein said second elastomeric spring has an external profile substantially similar to that of the elastomeric spring located within the pneumatic spring.

13. The vehicle suspension of claim 1 in which the elastomeric spring is of hollow construction over part of its length and of solid construction over the remaining part of its length.

14. The vehicle suspension of claim 13 in which the solid part is adjacent the end connected to said first rigid member.

15. A vehicle suspension comprising a pneumatic spring having a closed body with first and second rigid members interconnected by a toroidal shape flexible member of substantially gas-impermeable material and provided within the pneumatic spring an elastomeric spring having a first end connected to said first rigid member and a second end which is spaced from said second rigid member when the closed body of the pneumatic spring is pressurized to a normal working pressure, said second end being free to move transversely relative to said first end, the elastomeric spring being positioned within the closed body of the pneumatic spring such that in normal use of the vehicle suspension applied compression loading is withstood solely by the pneumatic spring and such that the applied compression loading acts on the elastomeric spring only in the event of a pressurization failure of the pneumatic spring, said elastomeric spring being of generally circular cross-sectional shape in a plane perpendicular to the normal direction of movement of the rigid members one towards the other, the elastomeric spring being substantially hollow over part of the length thereof remote from said first end which is connected to the first rigid member, the external diameter of the elastomeric spring within the pneumatic spring increasing progressively over part of the length of the elastomeric spring and decreasing progressively over a remaining part of the length of the elastomeric spring from said first to said second end of the spring whereby in the event of pressurization failure of the pneumatic spring the elastomeric spring allows relative movement of the first and second rigid members both in said normal direction of movement of the rigid members one towards the other and in directions perpendicular thereto and whereby both the vertical compression stiffness and horizontal shear stiffness of the elastomeric spring progressively increase when, in use, the elastomeric spring is subject to an increasing compression loading.

* * * * *

UNITED STATES PATENT AND TRADEMARK OFFICE
CERTIFICATE OF CORRECTION

PATENT NO. : 4,690,388
DATED : September 1, 1987
INVENTOR(S) : Reginald HARRISON It is certified that error appears in the above-identified patent and that said Letters Patent is hereby corrected as shown below:

Column 4, line 26, (Claim 1, line 13) after "suspension" insert --the elastomeric spring is in an unloaded condition and--.

Column 4, line 27, (Claim 1, line 14) delete "applied".

Column 4, line 27, (Claim 1, line 14) after "loading" insert --applied to the vehicle suspension--.

Column 4, line 34, (Claim 1, line 21) change "pregressively" to --progressively--.

Column 6, line 16, (Claim 15, line 13) after "suspension" insert --the elastomeric spring is in an unloaded condition and--.

Column 6, line 17, (Claim 15, line 14) delete "applied".

Column 6, line 17, (Claim 15, line 14) after "loading" insert --applied to the vehicle suspension--.

Signed and Sealed this

Thirty-first Day of May, 1988

Attest:

DONALD J. QUIGG

Attesting Officer

Commissioner of Patents and Trademarks